Feb. 15, 1927.

J. A. SKAGGS 1,617,868

RESERVE GASOLINE TANK AND FILTER

Filed June 19, 1924

Inventor

James A. Skaggs.

By Frease and Bach

Attorneys

Patented Feb. 15, 1927.

1,617,868

UNITED STATES PATENT OFFICE.

JAMES A. SKAGGS, OF CANTON, OHIO.

RESERVE GASOLINE TANK AND FILTER.

Application filed June 19, 1924. Serial No. 721,108.

The invention relates to reserve gasoline tanks for use upon motor vehicles, and more especially to a combination reserve tank, filter and priming cup, adapted to be operatively connected to the usual vacuum feed system, such as is at present in common use upon automobiles.

The objects of the invention are to provide a combined gasoline reserve tank and filter in which the tank is automatically filled by the action of the usual vacuum tank, all of the gasoline passing into the tank being first filtered as it passes through a priming cup located within the tank, any dirt or foreign matter thus removed from the gasoline being retained in a sediment trap communicating with the priming cup, which may be drained from time to time; the reserve tank being arranged to be cut off from the main gasoline supply tank and vacuum tank if desired, in order to use the reserve tank as a measuring tank.

The above and other objects may be attained by constructing the device in the manner illustrated in the accompanying drawing, in which—

Figure 1:
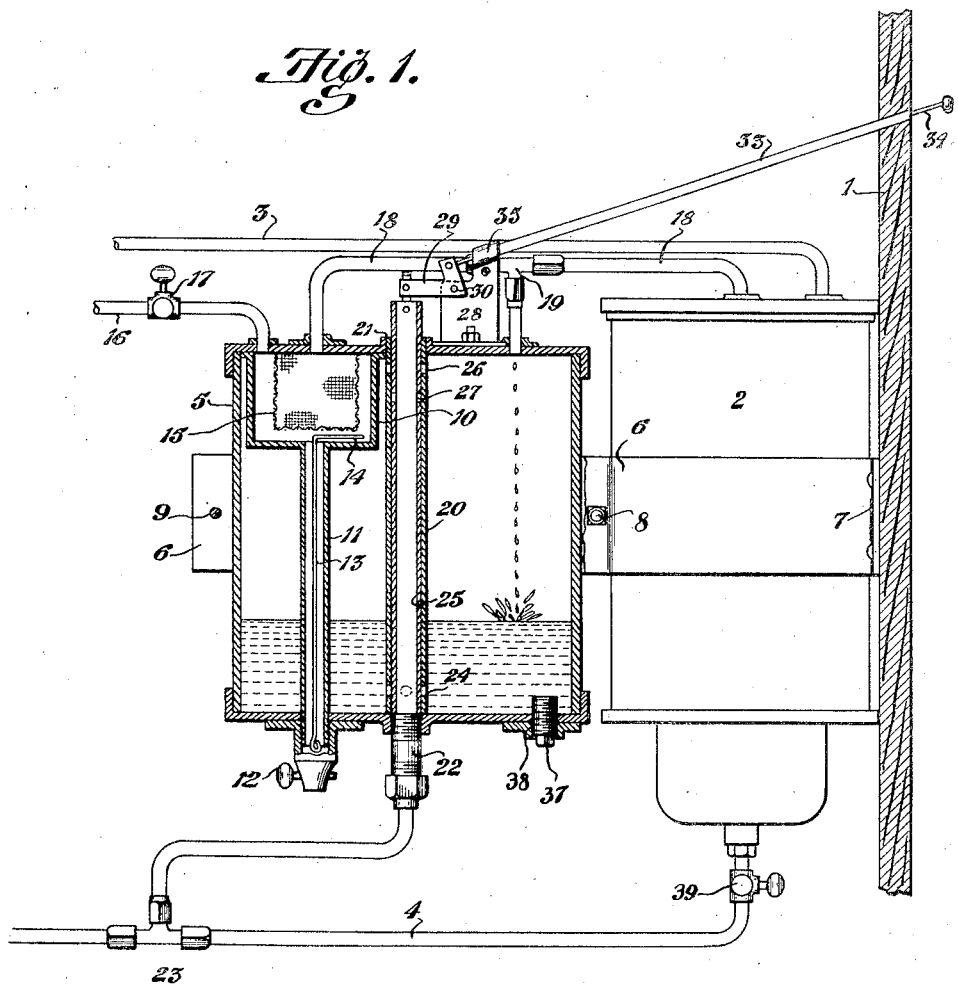
Figure 2:
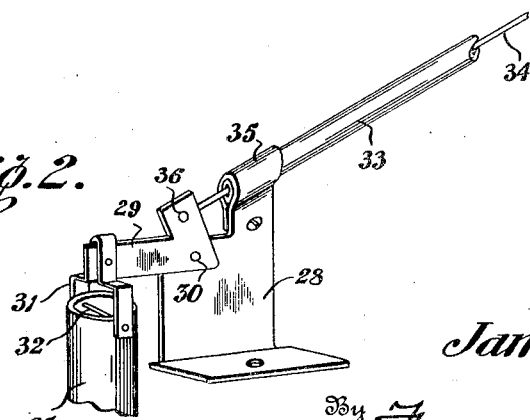

Figure 1 is a vertical, sectional view of a reserve gasoline tank embodying the invention, the usual vacuum tank being shown in elevation; and Fig. 2, a detail perspective view of the valve operating mechanism for the reserve supply tank.

Similar numerals refer to similar parts throughout the drawing.

The instrument board of an automobile is indicated at 1, and the vacuum tank 2, such as is commonly used in vacuum feed systems, may be supported thereon in the usual manner, the vacuum tank being connected to the intake manifold of the engine in the usual manner as by the pipe 3, which communicates with the upper end of the vacuum tank.

A pipe 4 is connected to the lower end of the vacuum tank and leads to the carbureter in the usual manner, for the purpose of feeding gasoline thereto by gravity as is customary in these systems.

The reserve tank 5 may be supported by the curved brackets 6 connected to the instrument board as by the flanges 7, a bolt 8 drawing the brackets together between the tanks 2 and 5, and a bolt 9 connecting the flanged ends of the brackets and clamping the reserve tank therebetween. It will be understood, however, that the reserve tank may be independently mounted upon the dashboard or upon any suitable portion of the motor.

A priming cup 10 is provided in the upper portion of the reserve tank and communicates with the depending sediment trap 11 which extends through the lower end of the tank and is provided with a drain cock 12. An agitator 13 may be located in the sediment trap and provided with the angular end 14 extended into the priming cup.

By removing the drain cock, the end of the agitator may be grasped by pliers or the like, and operated to disturb any sediment or dirt lodged in the priming cup.

A cup shaped filter 15 of fine wire cloth is connected at its open end to the top wall of the tank and extends down into the central portion of the priming cup.

The gasoline supply pipe 16, which leads from the main gasoline supply tank, communicates with the priming cup at a point outside of the filter cup 15, and may be provided with a valve 17 for cutting off the supply of gasoline to the reserve tank when it is desired to use the same as a measuring tank.

A pipe 18 communicates with the priming cup, within the filter cup 15, and leads to the vacuum tank 2. A T 19 is provided in the pipe 18 and communicates with the gasoline reserve tank, thus providing for a portion of the gasoline, drawn from the main supply tank, to be deposited in the reserve tank until the same is filled.

A tube 20 is extended through the reserve supply tank communicating at its upper end with the central opening 21 in the upper wall of the reserve tank, and at its lower end with the pipe 22 which communicates with the pipe 4 as by a T 23. One or more apertures 24 are provided in the tube 20 at a point near the bottom of the reserve tank.

A tube 25 is slidably mounted in the tube 20, normally resting upon the upper end of the pipe 22 as shown, and as the same fits snugly within the tube 20, the apertures 24 are thus normally closed.

The upper end of the tube 20 is provided with an aperture 26 and the slidable tube 25 is provided with a similar aperture 27 arranged to register therewith when the sliding tube is raised to the open position, as will be further described.

A bracket 28 is mounted upon the upper wall of the reserve tank and a bell crank 29 is pivoted thereon as at 30, the horizontal arm thereof being provided with a yoke 31 connected by a pin 32 to the upper end of the sliding tube 25.

The tubular casing 33 of the choke wire 34, is fixed within the cylindrical portion 35 of the bracket 28, the choke wire being connected as at 36 to the upright arm of the bell crank, the other end thereof extending through the instrument board as shown in Fig. 1.

A drain plug 37 may be provided for normally closing the drain aperture 38 in the bottom of the reserve tank. A valve 39 may also be provided in the pipe 4, adjacent to the vacuum tank 2, for cutting off the vacuum tank when it is desired to use the supply tank as a measuring tank.

It will be obvious that as gasoline is sucked from the main supply tank by the vacuum tank, it must first pass through the filter cup 15 which removes all sediment and dirt, permitting the same to settle in the sediment trap and allowing the filtered gasoline to be carried to the vacuum tank from where it is fed by gravity to the carbureter in the usual manner.

It will be seen that a portion of the gasoline sucked from the main supply tank by the vacuum tank will be received into the reserve tank through the T 19, and since the action of the reserve tank to the pipe 4 is normally closed, the reserve tank will continue to receive gasoline in this manner until the same is filled, after which all of the gasoline sucked through the pipe 18 will pass into the vacuum tank.

Should the car run out of gasoline while on the road, the reserve supply in the tank 5 may be conveyed by gravity through the pipe 22 into the pipe 4 to the carbureter, by pulling the wire 34 outward until the lower end of the tube 25 is raised above the apertures 24 in the tube 20, at which time the apertures 26 and 27 will register, thus permitting the gasoline in the reserve tank to pass through the apertures 24 into the pipe 22, while air will be admitted through the apertures 26 and 27 into the tube 25 to permit a normal flow of the gasoline.

When it is desired to use the reserve supply tank as a measuring tank in order to test the number of miles obtained on a given amount of gasoline, the reserve tank 5, which is made to contain an even gallon or other known quantity, is filled as above described, after which the valves 17 and 39 are closed, cutting off the supply of all gasoline excepting that contained in the reserve tank.

The tube 25 is then raised as above described, permitting the gasoline from the reserve tank to be conveyed to the carbureter by gravity and the entire contents of the reserve tank may thus be used to determine the mileage.

I claim:—

1. In combination with a fuel supply and a carbureter, a vacuum tank communicating with the carbureter, a reserve supply tank, a filtering cup connected to the fuel supply, a sediment trap extending from the bottom of the filtering cup through the bottom of the tank, a continuous pipe connecting the filtering cup and vacuum tank and having a T communicating with the reserve tank, and a normally closed connection between the reserve tank and the carbureter.

2. In combination with a fuel supply and a carbureter, a vacuum tank communicating with the carbureter, a reserve supply tank, a filtering cup connected to the fuel supply, a filter in the filtering cup, a sediment trap extending from the bottom of the filtering cup through the bottom of the tank, a continuous pipe connecting the priming cup and vacuum tank and having a T communicating with the reserve tank, and a normally closed connection between the reserve tank and the carbureter.

3. In combination with a fuel supply and a carbureter, a vacuum tank communicating with the carbureter, a reserve supply tank, a filtering cup in the reserve tank connected to the fuel supply, a filter in the filtering cup, a sediment trap communicating with the filtering cup and extending through the bottom of the reserve tank, a continuous pipe connecting the filtering cup and vacuum tank and having a T communicating with the reserve tank, and a normally closed connection between the reserve tank and the carbureter.

4. In combination with a fuel supply and a carbureter, a vacuum tank communicating with the carbureter, a reserve supply tank, a filtering cup in the reserve tank, a wire cloth filter cup in the filtering cup, a connection to the fuel supply outside of said filter cup, a continuous pipe connected to the vacuum tank and communicating with the filtering cup inside of said filter cup, and having a T communicating with the reserve tank, a sediment trap communicating with the filtering cup and extending through the bottom of the reserve tank, and provided with a drain and a normally closed connection between the reserve tank and the carbureter.

5. In combination with a fuel supply and a carbureter, a vacuum tank communicating with the carbureter, a reserve supply tank, a filtering cup connected to the fuel supply, a filter in the filtering cup, a continuous pipe connecting the filtering cup and vacuum tank and having a T communicating with the reserve tank, a normally closed connection between the reserve tank and the carbureter, means for closing the connection between the fuel supply and filtering cup, means for closing the connection between the vacuum tank and carbureter, and means for opening the connection between the reserve tank and the carbureter.

In testimony that I claim the above I have hereunto subscribed my name.

JAMES A. SKAGGS.